(12) United States Patent
Schoenfeld et al.

(10) Patent No.: US 9,160,201 B2
(45) Date of Patent: Oct. 13, 2015

(54) DIRECT CONTACT PLUG-IN CONNECTION HAVING END FACE DIRECT CONTACT

(75) Inventors: Michael Schoenfeld, Leinfelden-Echterdingen (DE); Peter Rehbein, Thuengersheim (DE); Juergen Stein, Illingen (DE); Achim Puettner, Aalen (DE)

(73) Assignee: ROBERT BOSCH GMBH, Stuttgart (DE)

(*) Notice: Subject to any disclaimer, the term of this patent is extended or adjusted under 35 U.S.C. 154(b) by 121 days.

(21) Appl. No.: 14/000,038

(22) PCT Filed: Feb. 10, 2012

(86) PCT No.: PCT/EP2012/052320
§ 371 (c)(1),
(2), (4) Date: Dec. 24, 2013

(87) PCT Pub. No.: WO2012/110423
PCT Pub. Date: Aug. 23, 2012

(65) Prior Publication Data
US 2014/0113501 A1   Apr. 24, 2014

(30) Foreign Application Priority Data
Feb. 17, 2011   (DE) .................. 10 2011 004 300

(51) Int. Cl.
*H02J 9/06*   (2006.01)
*H05B 37/02*   (2006.01)
*H01R 13/24*   (2006.01)
*H02J 7/00*   (2006.01)

(52) U.S. Cl.
CPC ............ *H02J 9/061* (2013.01); *H01R 13/2421* (2013.01); *H02J 7/0042* (2013.01); *H05B 37/0218* (2013.01); *H05B 37/0254* (2013.01); *Y10T 307/625* (2015.04)

(58) Field of Classification Search
CPC .. H01R 13/6658; H01R 23/025; H01R 12/62; H01R 13/2421; H01R 13/2428; H05K 3/365
USPC ..................... 439/76.1, 67, 700, 66
See application file for complete search history.

(56) References Cited

U.S. PATENT DOCUMENTS

| | | | |
|---|---|---|---|
| 4,768,971 A * | 9/1988 | Simpson | ............ 439/329 |
| 5,160,269 A * | 11/1992 | Fox et al. | ............ 439/67 |
| 5,871,362 A | 2/1999 | Campbell et al. | |
| 6,002,437 A | 12/1999 | Morioka et al. | |

FOREIGN PATENT DOCUMENTS

| | | |
|---|---|---|
| DE | 102008001557 | 11/2009 |
| JP | 8-236228 | 9/1996 |
| JP | 10-255901 | 9/1998 |
| JP | 2005-294238 | 10/2005 |

* cited by examiner

*Primary Examiner* — Gary Paumen
(74) *Attorney, Agent, or Firm* — Kenyon & Kenyon LLP

(57) ABSTRACT

In a direct contact plug-in connection having a circuit board, which has contact surfaces on its one side, and having a direct contact plug that is plug-connectible to the circuit board, which has contact elements for the electrical direct contacting of the contact surfaces of the circuit board, the contact surfaces are provided on a circuit board section that runs transversely to the plugging direction of the plug connection, the contact elements each contacting the contact surfaces, using their front end face, in the plugging direction.

6 Claims, 4 Drawing Sheets

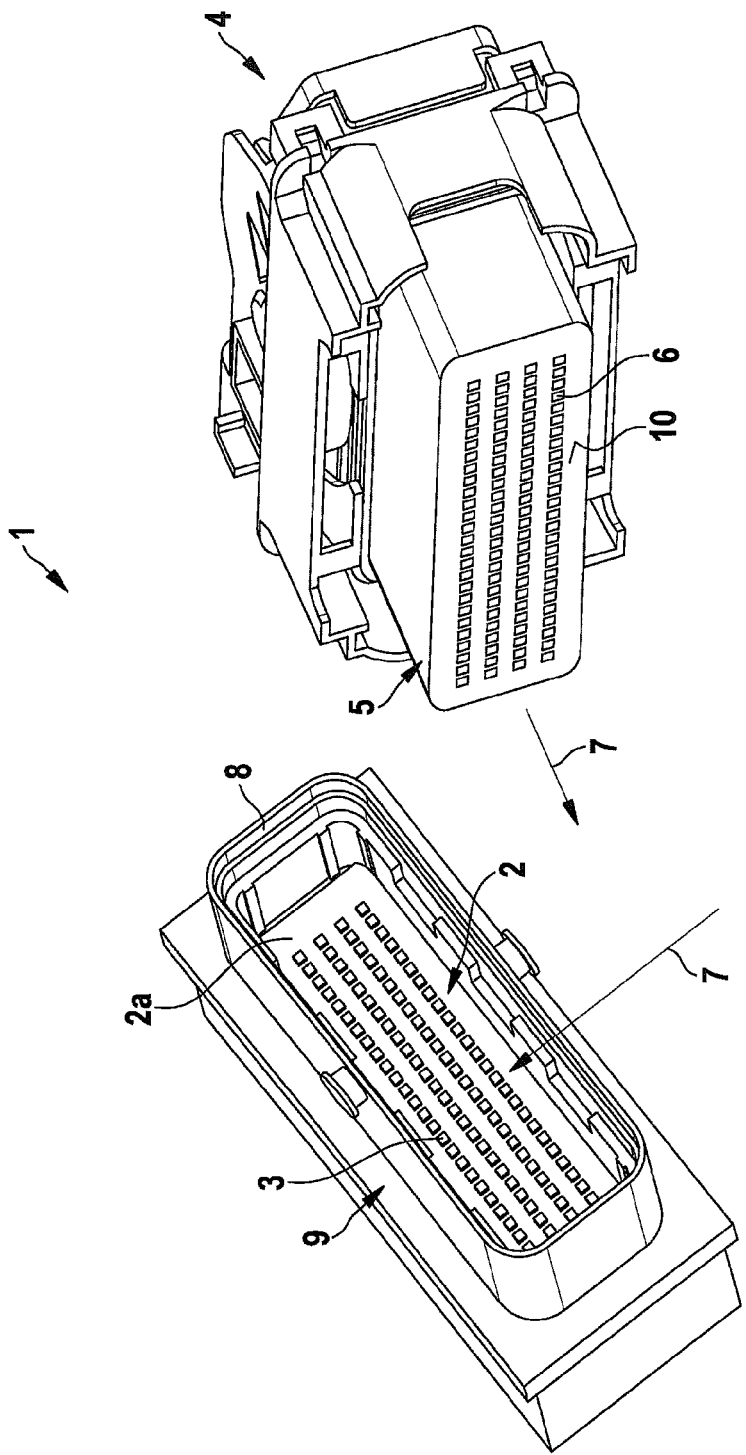

US 9,160,201 B2

1

DIRECT CONTACT PLUG-IN CONNECTION HAVING END FACE DIRECT CONTACT

FIELD OF THE INVENTION

The present invention is directed to a device having a direct contact plug-in connection.

BACKGROUND INFORMATION

Control units are mostly made up of a circuit board, on which electronic components are placed, and a housing. In engine control units, a male multipoint connector is usually mounted on the circuit board, in order to produce the electrical connection between a wire harness plug and the circuit board. The male multipoint connector thus represents an additional component in the assembly of the control unit.

So-called electrical direct contacts are also known in which the male multipoint connector is omitted and the individual poles of the wire harness plug are contacted directly on the circuit board. For this, electrical contact surfaces ("lands") are provided, which are contacted directly by contact elements of the male multipoint connector. The contact surfaces of a direct contact plug-in connection are mostly positioned in two rows, namely in respectively one row on the upper and the lower side of the circuit board edge. By contrast to a contact male multipoint connector, which may be made up of a plurality of contact rows, in a direct contact plug-in connection there may thus be the disadvantage of a low number of pins. If the possibility of mounting contact surfaces on the upper and lower side of the circuit board edge has already been utilized, up until now there existed only the possibility of diminishing the distance between the pins. This possibility is usually declined, however, for reasons of reliability.

SUMMARY

By contrast to this, an object of the present invention is to increase the number of contacts (=the pin number), in the case of a direct contact plug-in connection of the type mentioned at the outset.

According to the present invention, the contact surfaces are provided on a circuit board section that is situated transversely to the plugging direction, particularly forming an angle of 90°, whose width forming an angle is clearly greater than the thickness of the circuit board. On the clearly greater circuit board surface that is thereby available, a higher number of contact surfaces is able to be accommodated, which lie transversely to the plugging direction and are contacted by the front end faces of the contact elements that are in the plugging direction.

BRIEF DESCRIPTION OF THE DRAWINGS

FIG. 1 shows a direct contact plug-in connection, according to the present invention, between a circuit board and a direct contact plug.

2

Figure 3A:
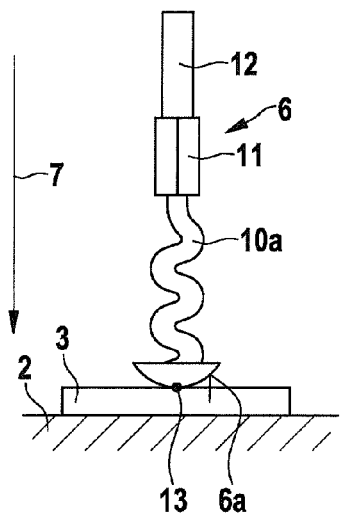
FIG. 3a shows a first variant of a contact element of the direct contact plug according to the present invention.
Figure 3B:
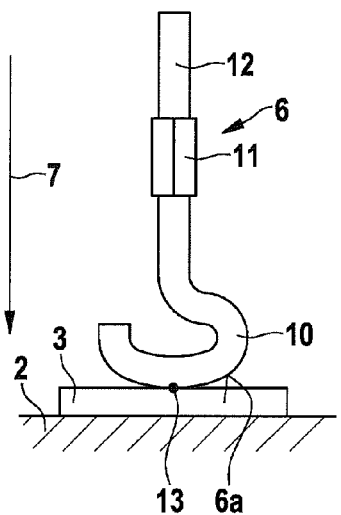
FIG. 3b shows a second variant of a contact element of the direct contact plug according to the present invention.
Figure 3C:
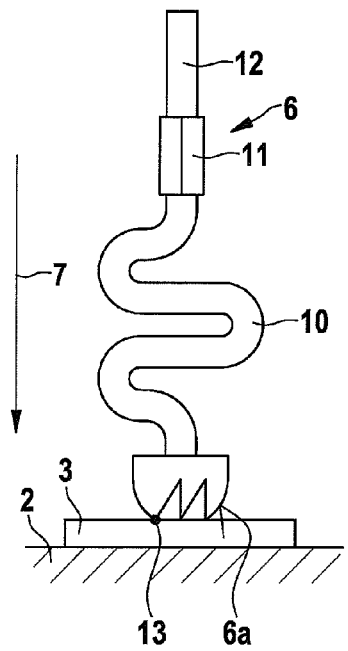
FIG. 3c shows a third variant of a contact element of the direct contact plug according to the present invention.
Figure 3D:
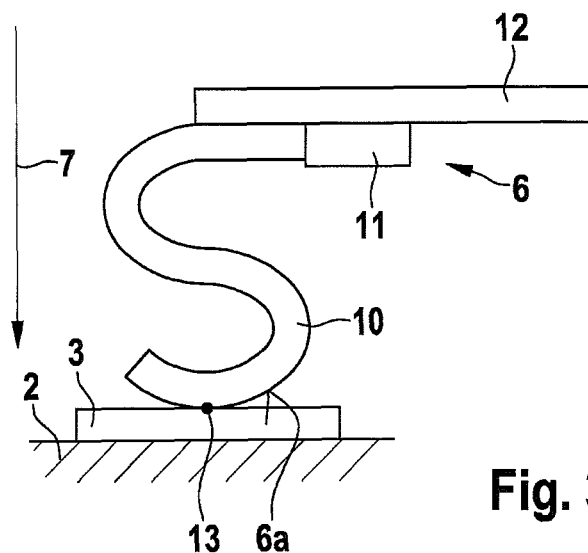

FIG. 3d shows a fourth variant of a contact element of the direct contact plug according to the present invention.

Figure 3E:
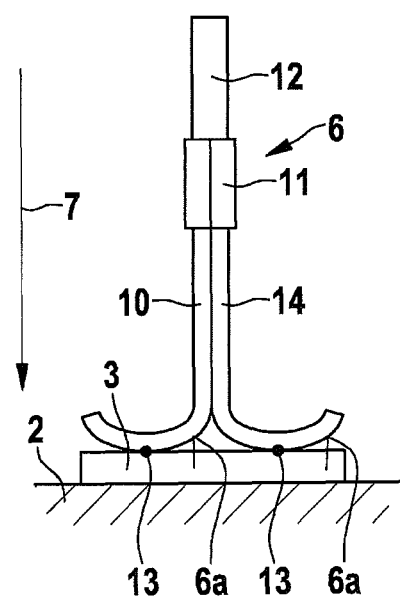

FIG. 3e shows a fifth variant of a contact element of the direct contact plug according to the present invention.

DETAILED DESCRIPTION

Plug connection 1, shown in FIG. 1, includes a circuit board 2 which on its one side has a plurality of contact surfaces ("lands") 3, as well as a direct contact plug (e.g. a wire harness plug) 4, which has a contact carrier 5 having a plurality of contact elements 6 for the electrical direct contacting of contact surfaces 3 of circuit board 2. Direct contact plug 4 is plugged in plugging-in direction 7 into plug-in accommodation 8 of a control unit housing 9 that accommodates circuit board 2.

Contact surfaces 3 are provided in a plurality of longitudinal rows (in this case, for example, in four longitudinal rows of 25 contact surfaces each) on a circuit board section 2a situated at right angles to plugging direction 7 of plug connection 1. Contact surfaces 3 thus lie at right angles to plugging direction 7 and are each contacted by the front end faces 6a, in the plugging direction, of contact elements 6, which project, in plugging direction 7, from contact carrier 5.

Figure 2A:
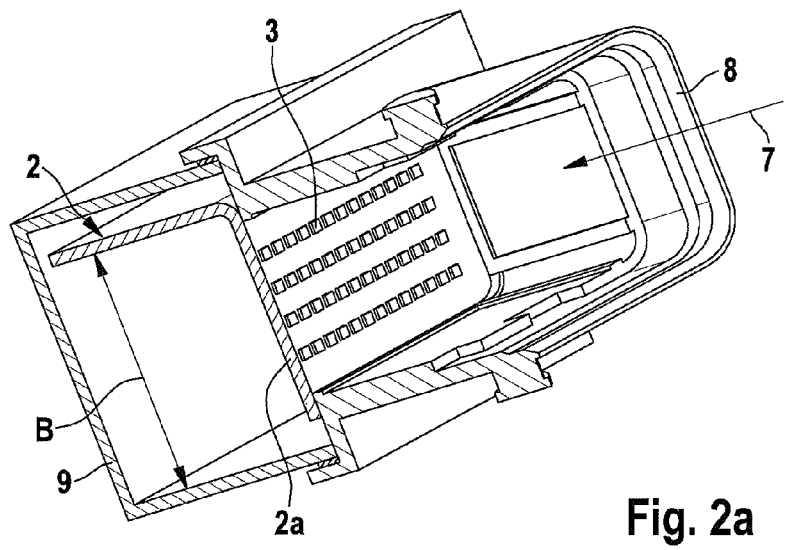
FIG. 2a shows a first variant, according to the present invention, of a circuit board forming an angle.
Figure 2B:
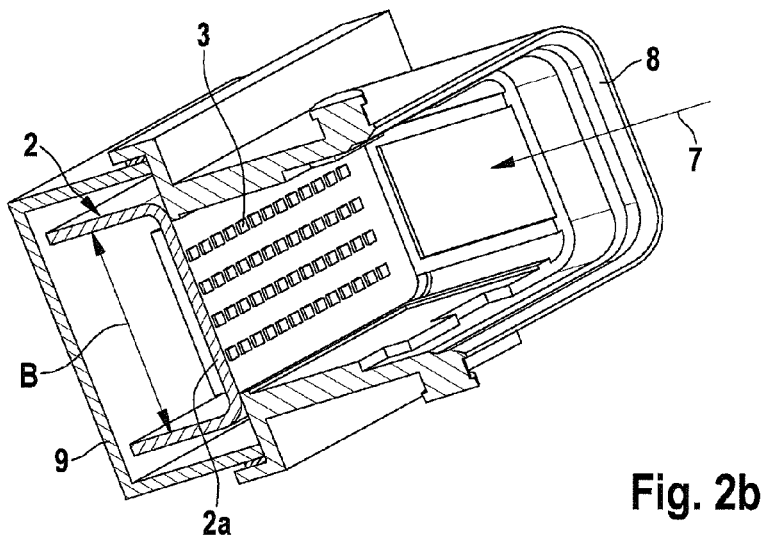
FIG. 2b shows a second variant, according to the present invention, of a circuit board forming an angle.

Circuit board section 2a may, for instance, be at an angle of 90° with respect to remaining circuit board 2 (FIG. 2a), or be formed by the middle leg of a U-shaped circuit board that is at an angle (FIG. 2b). Since the width B of circuit board section 2a is clearly greater than the thickness of circuit board 2, a very much greater number of contact surfaces 3 are able to be accommodated on circuit board section 2a than on the upper and lower side of the circuit board edge.

In FIG. 3, various variants of metallic contact elements 6 of direct contact plug 4 are shown, in which front contact section 10, in plugging direction 7, is developed to be resilient in the plugging direction, that is, as a spring contact. At rear crimped section 11, in plugging direction 7, of contact element 6, an electric line 12 of the wire harness (not shown) is connected electrically conductively, namely either in plugging direction 7 or transversely to it. Alternatively, electric line 12 may also be welded to contact element 6. The contact point or the contact points between front end face 10 of front contact section 10 and contact surface 3 is designated by 13.

FIG. 3a shows a metallic contact element 6, whose front contact section 10, in the plugging direction, is developed in meander or zigzag shape, and is therefore springy in plugging direction 7. Front end face 10 lies against contact surface at a contact point 13.

FIG. 3b shows a metallic contact element 6, whose front contact section 10, in plugging direction 7, is developed in the shape of a hook, and is therefore springy in plugging direction 7. Front end face 10 lies against contact surface 3 at a contact point 13.

FIG. 3c shows a metallic contact element 6, whose front contact section 10, in plugging direction 7, is developed wave-shaped and is therefore springy in plugging direction 7. Front end face 10 contact surface 3 is serrated at its end face, and therefore lies against surface 3 at a plurality of contact points 13.

FIG. 3d shows a metallic contact element 6, whose front contact section 10, in plugging direction 7, is developed S-shaped and is therefore springy in plugging direction 7. Front end face 10 lies against contact surface 3 at a contact point 13.

FIG. 3e shows a metallic contact element 6, whose front contact section 10 is formed by two contact springs 14 that are welded to each other at one end. The free ends of contact springs 14 are bent in opposite directions and lie against contact surface 3, at a contact point 13 respectively.

Instead of round lines, as shown in FIGS. 3a to 3e, electric lines 12 may also be developed as flat lines.

What is claimed is:

1. A direct contact plug-in connection, comprising:
    a circuit board including a side provided with contact surfaces; and
    a direct contact plug adapted to be plug-connected to the circuit board, the plug including contact elements for an electrical direct contacting with the contact surfaces of the circuit board, wherein:
        the contact surfaces are provided on a circuit board section that runs transversely to a plugging direction of the plug-in connection, and
        the contact elements each has a front end face that contacts a respective one of the contact surfaces in the plugging direction,
    wherein the circuit board section is at an angle with respect to a remaining portion of the circuit board, and
    wherein the circuit board section is formed by a middle leg of the circuit board that is doubly at an angle.

2. The direct contact plug-in connection as recited in claim 1, wherein the middle leg of the circuit board is doubly at an angle in a U-shaped manner.

3. The direct contact plug-in connection as recited in claim 1, wherein the contact elements are springy in the plugging direction of the plug-in connection.

4. The direct contact plug-in connection as recited in claim 1, wherein the contact surfaces of the circuit board are positioned in a plurality of longitudinal rows on the circuit board section.

5. The direct contact plug-in connection as recited in claim 4, wherein the contact surfaces are positioned in one of three and four of the longitudinal rows.

6. A circuit board of a direct contact plug-in connection, comprising:
    a circuit board section provided transversely to a plugging direction of the plug-in connection; and
    a plurality of contact surfaces situated on the circuit board section for an electrical direct contacting,
    wherein the circuit board section is at an angle with respect to a remaining portion of the circuit board, and
    wherein the circuit board section is formed by a middle leg of the circuit board that is doubly at an angle.

* * * * *